United States Patent [19]

Supper

[11] 3,913,834
[45] Oct. 21, 1975

[54] HEATING INSTALLATION FOR MOTOR VEHICLES

[75] Inventor: Ottmar Supper, Sindelfingen, Germany

[73] Assignee: Daimler-Benz Aktiengesellschaft, Germany

[22] Filed: Aug. 9, 1973

[21] Appl. No.: 386,971

[30] Foreign Application Priority Data
Aug. 10, 1972 Germany............................ 2239303

[52] U.S. Cl........................ 237/12.3 A; 137/625.21
[51] Int. Cl.².......................................... B60H 1/02
[58] Field of Search........... 137/625.21; 237/12.3 R, 237/12.3 A

[56] References Cited
UNITED STATES PATENTS

| | | | |
|---|---|---|---|
| 3,029,841 | 4/1962 | Bitzer............................ | 137/625.21 |
| 3,286,730 | 11/1966 | Beck et al...................... | 137/625.21 |
| 3,297,052 | 1/1967 | Robinson....................... | 137/625.21 |
| 3,507,297 | 4/1970 | Dann.............................. | 137/625.21 |
| 3,731,729 | 5/1973 | Beatenbough et al......... | 137/625.21 |

Primary Examiner—William E. Wayner
Assistant Examiner—W. E. Tapolcai, Jr.
Attorney, Agent, or Firm—Craig & Antonelli

[57] ABSTRACT

A heater actuating system regulatable on the air-side in a motor vehicle, which includes at least one adjusting lever that actuates a pneumatic rotary slide valve by means of which vacuum or atmospheric pressure is adapted to be conducted to a working element actuatable thereby which, in turn, opens or closes a valve in the feed line of the heating medium to a heater body; one adjusting lever, preferably a manually actuatable adjusting lever is thereby provided for the warm air discharge of each of the two sides of the motor vehicles whereby the adjusting lever during its deflection in one direction increasingly opens air slots and during the beginning of this deflection simultaneously adjusts an associated pneumatic rotary slide valve in one direction; the adjusting lever, during its deflection in the opposite direction thereby increasingly closes the air slots and at the end of its return pivot movement returns the pneumatic rotary slide valve again into its starting position.

16 Claims, 13 Drawing Figures

HEATING INSTALLATION FOR MOTOR VEHICLES

The present invention relates to a heater actuating installation of a motor vehicle regulatable on the air-side with at least one adjusting lever that actuates a pneumatic rotary slide valve, by means of which vaccum or atmosphere is adapted to be conducted to a working element actuatable by the same which opens or closes the valve in the feed line of the heating medium to a heater body.

Heating installations regulatable on the water-side and on the air-side exist in heating systems within motor vehicles. In the heating systems controllable on the water-side, exclusively a water cock is more or less opened by the actuation of an adjusting lever so that the heating medium can flow through the heater body in larger or smaller quantities, which heater body is subjected to an air flow by dynamic pressure air which thereupon is conducted as more or less heater-up air into the vehicle interior.

In a heating system controllable on the air side, a water cock is completely opened at the beginning of the adjustment of an adjusting lever for the most part pneumatically by a pneumatic working element and thereupon the supply of the heated air into the vehicle interior is more or less opened up by the further deflection of the adjusting lever. The temperature in the vehicle interior can be controlled better by means of the heating system controllable on the air-side and additionally the heating system does not react with as much inertia as a heating system controllable on the water-side, i.e., it becomes more rapidly warm or cool in the vehicle interior in the desired manner after the adjustment of the adjusting lever.

It is desirable with such types of heating systems that the feed of heated-up air can be controlled in each half of the vehicle interior independently of the other side. In order to achieve this, heretofore adjusting installations have been used which are costly and uneconomical, which tend to jam and which include a large number of different parts.

It is the aim of the present invention to avoid these disadvantages and to provide an adjusting installation which consists of few parts adapted to be manufactured in a simple manner, and which in particular with respect to the used pneumatic rotary slide valve for the actuation both of the one as well as the other side can be assembled with the same parts.

The underlying problems are solved according to the present invention in that for the heated-air discharge of each of the two sides of the vehicle, one preferably manually actuatable adjusting lever each is provided which, on the one hand, increasingly opens air slots during its pivoting movement in one direction and at the beginning of this pivot movement simultaneously adjusts an associated pneumatic rotary slide valve in one direction and which, on the other, during a pivot movement in the opposite direction increasingly closes the air slots and at the end of its return pivot movement adjusts the pneumatic rotary slide value again back into its starting position.

If two similar rotary slide values are used which are arranged axially symmetrically with respect to one another, then these two rotary slide valves, which are arranged on one side and on the other side of the support plate of the associated adjusting lever, have to be pivoted in opposite directions with respect to their construction and assembly during the adjustment of the adjusting lever in one direction in order to be able to carry out the tasks assigned thereto. In order to achieve this, the similar rotary slide valves which are pivotal out of a centr position toward both sides include each an apertured plate provided with four bores of which the center bores are connected with a feed and a discharge line to the slide valve member and the outer bores are connected with the atmosphere, and the apertured plate is covered off by a program-disk with a control channel surrounded peripherally by a sealing lip and with one sealing surface each on the two sides thereof. The control channel connects in the center position of the rotary slide valve the ports or orifices of the two center bores with each other and in the two other positions a respective outer port or orifice with the adjacent center orifice of the associated bores. The center bore with the orifice of the apertured plate opposite the associated adjusting lever handle of one rotary slide valve and the center bore with the orifice of the apertured plate adjacent to associated adjusting lever handle of the other rotary slide valve may thereby be connected with each other by a pipeline whereas the remaining center bores of the two rotary slide valves may be connected by pipelines, on the one hand, with the working element as well as, on the other, with a vacuum tank while the outer bores lead respectively into the atmosphere.

If rotary slide valves are not arranged axially symmetrically to each other in a heater actuation installation, but are secured in the same position behind one another at mounting plates for the adjusting levers, then also identically constructed rotary slide valves may be used which are pivotal out of a position into further positions and are constructed identically as well as each include one apertured plate with three bores, of which a center and an outer bore are connected with a feed and a discharge line to the rotary slide valve and a third bore, whose orifice arranged facing the adjusting lever handle, is connected with the atmosphere, whereby additionally the apertured plate may be covered off by a program-disk with the control channel surrounded peripherally by a sealing lip and one sealing surface each on both sides thereof. A control channel connects in one position of the rotary slide valve the orifice of the center bore with the orifice of one of the outer bores and in the other position the orifice of the center bore with the orifice of the other outer bore. The bore with the center orifice of one rotary slide valve and the bore with the orifice opposite the adjusting lever handle of the other rotary slide valve may thereby be connected with each other by a pipeline whereas the bore provided with the center orifice of the other rotary slide valve may be connected with a working element and the orifice of the one rotary slide valve opposite the adjusting handle lever may be connected with a vacuum tank and the orifices of the bores of the two rotary slide valves which face the adjusting lever handle may each lead into the atmosphere.

According to a further feature of the present invention, the parts of the program-disk which are pressed against the apertured plate by a flat spring, especially those whose end surfaces abutting sealingly at the apertured plate, may consist of synthetic resinous material of any conventional type whereas the other parts of the program-disk, especially those which form the bearing or detent surfaces, may consist of metal, preferably of die-cast metal. The program-disk may also carry a pin which in the closing position of the adjusting lever engages in a radial slot matched to the diameter of the pin of the adjusting lever and in every open position engages in a slot also matched to the diameter of the pin which adjoins at the end of the radial slot opposite the pivot axis of the adjusting lever toward one side in circular shape with its center point coinciding with the pivot point of the adjusting lever so that the program-disk is pivoted out of the closing position by the initial pivoting of the adjusting lever and during a further pivoting of the adjusting lever remains in this deflected position for such length of time until the adjusting lever reaches again its closing position and therewith the pin reaches again the radial slot whereby only then is the program-disk pivoted back.

Additionally, a spring element may be arranged at the apertured plate of the rotary slide valve which in one position, for example, in the center position of the program-disk engages in a notch provided in the same and fixes the program-disk in this preferred position, especially during the installation of the rotary slide valve. This fixing of the program-disk considerably facilitates the assembly and installation since the rotary slide valve has to be assembled in this position and otherwise, under the constricted conditions locally prevailing, the rotary slide valve can be installed only wih greatest difficulties with its program-disk adjusted in the required position. Accordingly, it is an object of the present invention to provide a heater actuating mechanism which avoids by simple means the aforementioned shortcomings and drawbacks encountered in the prior art.

Another object of the present invention resides in a heater actuating installation of a motor vehicle which is the type providing a control on the air-side of the heater system, yet is simple in construction, utilizes relatively few parts and is extraordinarily reliable in operation.

A further object of the present invention resides in a heater actuating device of the type described above which is economical and permits a far-reaching use of identical parts for the independent control of the two sides of the vehicle.

A further object of the present invention resides in a heater actuating installation of motor vehicles which avoids jamming and malfunctioning, yet consists of relatively few individual parts which can be manufactured in a simple and economic manner.

A further object of the present invention resides in a rotary slide valve for heater actuating mechanisms which are simple in construction and easy to assemble and install.

These and further objects, features and advantages of the present invention will become more apparent from the following description when taken in connection with the accompanying drawing which shows, for purposes of illustration only, two embodiments in accordance with the present invention, and wherein.

Figure 1:
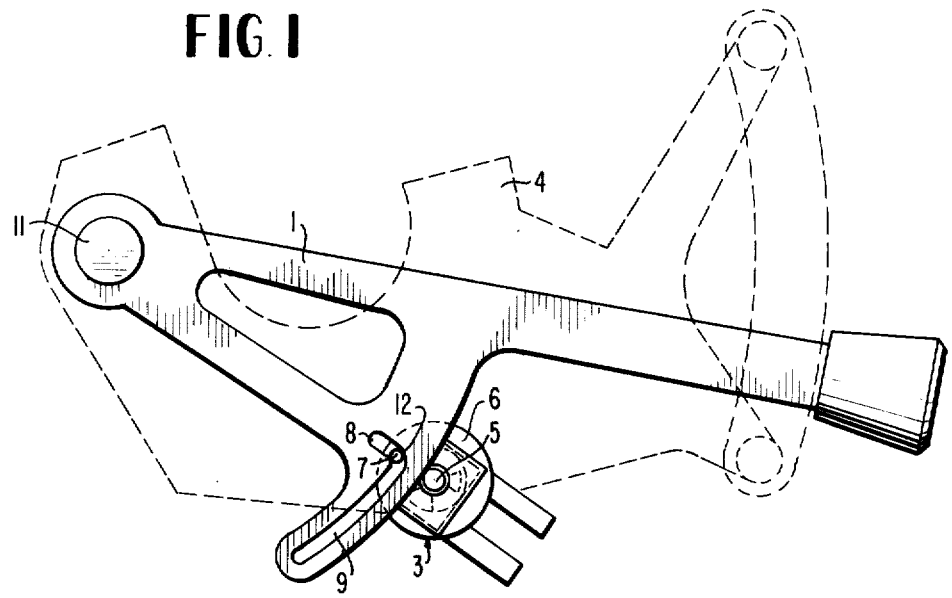
FIG. 1 is a somewhat schematic elevational view of a heater actuating installation according to the present invention.
Figure 3:
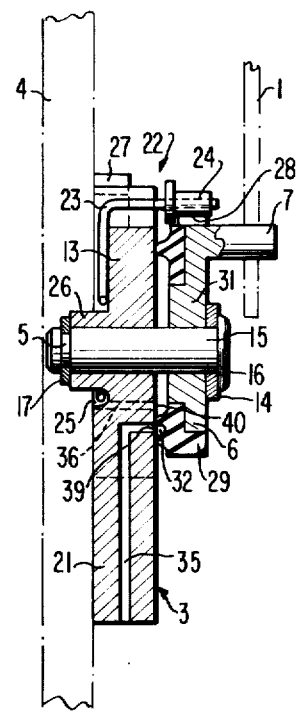
FIG. 3 is a cross-sectional view through a rotary slide valve according to line III—III of FIG. 2 in which the program-disk and all further parts are also shown.
Figure 13:
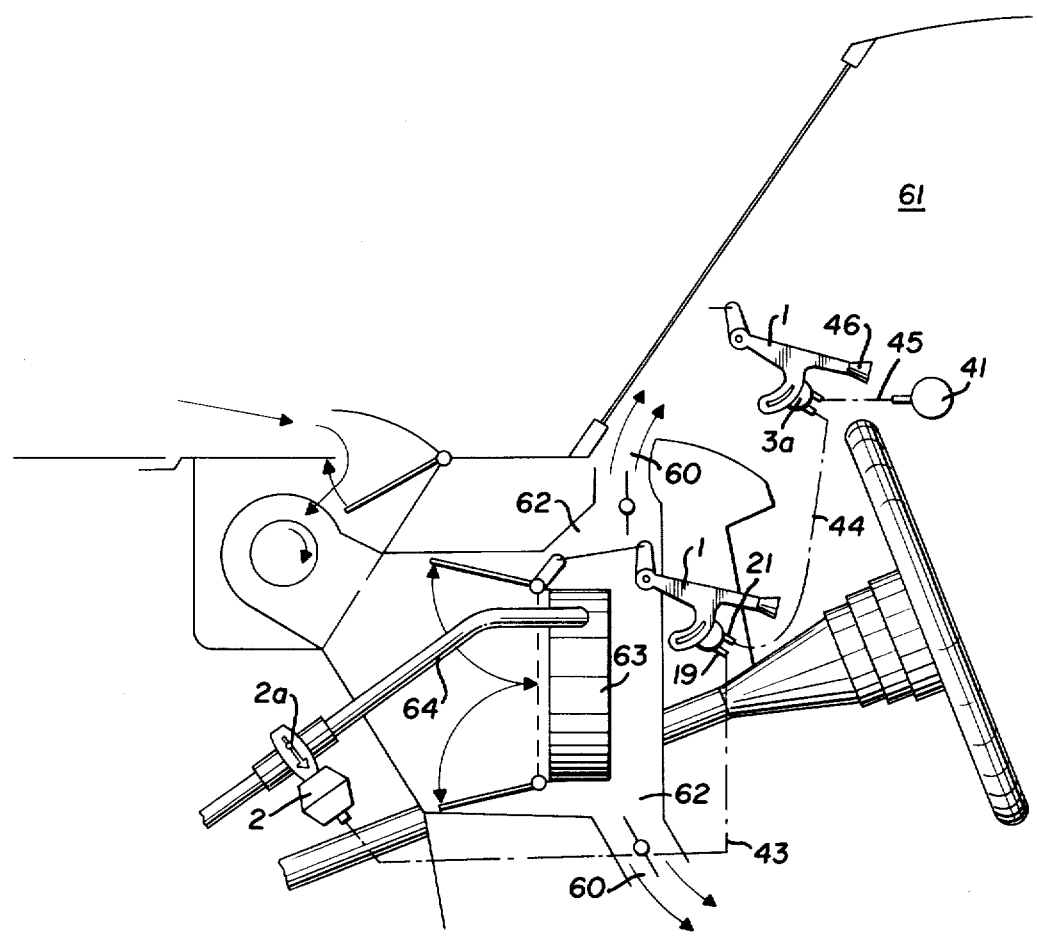
FIG. 13 is a schematic view of a front portion of a motor vehicle having a heating system according to the present invention.

Referring now to the drawing wherein like reference numerals are used throughout the various views to designate like parts, heated air discharged out of heater air slots 60, illustrated in FIG. 13, and arranged on each side of the vehicle interior, can be fed by the heater actuating installation according to the present invention into the vehicle interior 61 of a passenger motor vehicle. The heated air may be supplied to both sides of the vehicle interior by way of the heated air feed slots 60 or ducts 62 in FIG. 13 independently of one another in that both adjusting levers 1 or one of the two adjusting levers 1 are actuated. The warm air heater system of the present invention involves a heater system controllable on the air-side which is so constructed that upon actuation of one of the two adjusting levers 1, of which one is illustrated in FIG. 1 in the closing position, a valve, or water cock, 2a in FIG. 13 is opened by vacuum by means of a pneumatically actuatable working element 2 (FIGS. 4-7), whereby cooling water heated-up in the engine circulatory system flows into the heater body 63 in FIG. 13. Since the heater system is of conventional construction, only those parts which describe a part of the present invention are illustrated herein. During the beginning of the adjustment of the adjusting lever 1 out of the illustrated closing position (FIG. 1), the valve or water cock 2a for the heater body 63 is completely opened whereas the associated air discharge duct 62 is initially opened only slightly. During a further adjustment of the adjusting lever 1 in the manner in the upward direction, the associated or corresponding warm air feed duct 62 is increasingly opened until it is opened completely in the uppermost position of the adjusting lever 1 so that heated air can be increasingly discharged through the slot 60. When the adjusting lever 1 is pivoted back, the associated warm air feed duct 62 is increasingly closed until it is completely closed in the illustrated end position (FIG. 1 and FIG. 13) and if both adjusting levers 1 have assumed the position illustrated in FIG. 1, also the water cock 2a for the heater body 63 is closed so that the same is no longer heated. In order that the pneumatic working element 2 receives vacuum for its actuation, the heater actuating installation is provided with a rotary slide valve generally designated by reference numeral 3 which is operatively connected on each side of the vehicle with the adjusting lever 1 and is thereby actuated by the latter. In order that the rotary slide valve 3 mounted on the support plate 4 is each actuated only at the beginning and at the end of the pivot movement of th respective adjusting lever 1, a program-disk 6 of the rotary slide valve 3 which is rotatably supported by means of a mounting bolt 15 (FIG. 3), carries a pin 7 (FIGS. 1 and 3). This pin 7 engages in the closing position of the adjusting lever 1 (FIG. 1) in a radial slot 8 fitting the diameter of the pin 7 of the adjusting lever 1 and after the upward pivoting of the adjusting lever 1 engages in each opening position in a slot 9 also fitting the diameter of the pin 7 which adjoins the end 12 of the radial slot 8 opposite the pivot point 11 of the adjusting lever 1 toward one side in a circular shape with the center point of the circle coinciding with the pivot point 11 of the adjusting lever 1. By such an arrangement of the slots 8 and 9, the pin 7 is displaced out of the radial slot 8 into the circular shaped slot 9 only during the beginning of the pivot movement of the adjusting lever 1 and the program-disk 6 is pivoted thereby. The program-disk 6, after the initial movement of the adjusting lever, therefore remains for such length of time in its displaced or deflected position as the pin 7 remains in the circularly shaped slot 9.

Figure 2:
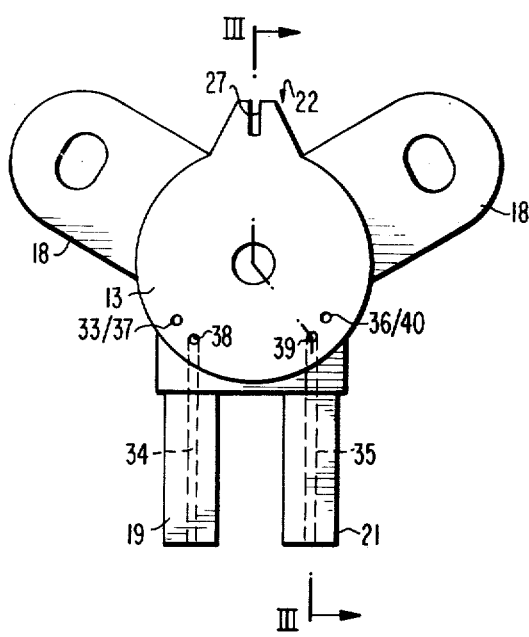
FIG. 2 is a front elevational view of a pneumatic rotary slide valve in accordance with the present invention without the program-disk which belongs thereto and the parts disposed above the same.
Figure 12:
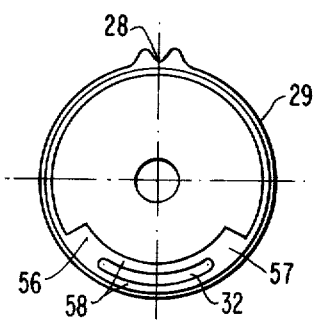
FIG. 12 is a plan view on the surface of the program-disk abutting on the apertured plate, which is provided with a control channel peripherally surrounded by a sealing lip and with sealing surfaces in accordance with the present invention.

The rotary slide valve 3, in addition to the aforementioned program-disk 6 includes an apertured plate 13, against which the program-disk 6 is pressed with the aid of a flat spring 14. This program-disk 6 as well as the apertured plate 13 are for that purpose provided with a central bore through which extends the bolt 15 on which the flat spring is carried and guided abutting at a collar 16 of the bolt 15. On the other side of the apertured plate 13 opposite the program disk 6, the bolt 15 is secured against falling out by a lock ring 17 which engages in a corresponding annular groove 5 at the bolt 15. The apertured plate 13 is additionally provided with two ears 18 for its mounting and fastening and additionally includes short connecting pipes 19 and 21 for the supply (inlet) and discharge (outlet) to and from the rotary slide valve, respectively. Additionally, a spring element generally designated by reference numeral 22 is arranged at the apertured plate 13 which consists of a bent spring 23 and of a bush 24 carried thereby. The free end of the spring 23 is bent into a ring 24 which is mounted on a cylindrically shaped boss 26 at the apertured plate 13. The specially bent spring 23 then engages in a slot 27 (FIGS. 2 and 3) in which it is guided. The bush 24 placed over the other spring end may engage in a notch 28 (FIG. 12) provided at the program-disk 6. As a result thereof, the program-disk 6 can be fixed in a preferred central position and can be installed more simply than without this detent position. A particularity of the program-disk 6 additionally consists in that it consists of several materials. More particularly, synthetic plastic material, such as synthetic resinous material of any conventional type, is vulcanized into the metal body consisting of die-cast metal so that the parts 29 of the program-disk 6 which are forced sealingly against the apertured plate 13 by the flat spring 14 consists of synthetic resinous material whereas other parts 31 of the program-disk 6, expecially those which form the notch 28 and the bearing surfaces for the bolt 15 consist of die-cast metal. A control channel 32 (FIGS. 3 and 12) surrounded by a sealing lip 58 (FIG. 12) is also formed in the synthetic plastic part 29 of the program-disk 6 which, as will be described more fully hereinafter, connects pair-wise with each other orifices of associated bores provided in the rotary slide valve 3 during the actuation thereof.

In one preferred embodiment in which, as already mentioned, the heater actuating installation is equipped with two adjusting levers 1 for the adjustment of the heating system of the right and left vehicle side, two rotary slide valves 3 are required which are secured at mounting plates 4 respectively axially symmetrically arranged to one another, i.e., directly with their backs toward one another. Even though in such an arrangement the program-disks of the two rotary slide valves 3 have to be pivoted in an opposite sense during their actuation by the two adjusting levers 1, nonetheless rotary slide valves constructed in an identical manner can be used if their apertured plates 13 are provided with four bores 33–36 and are provided with orifices or ports 37–40 belonging to the same. In the three possible positions of the program-disk 6 and therewith of the control channel 32, the orifices 38 and 39 of the center bores 34 and 35 are connected with each other in the center position of the rotary slide valve whereas in the two other positions respectively the two outer orifices 37 and 38 of the bores 33 and 34 or the bores 39 and 40 or the bores 35 and 36 are connected with each other.

The different positions of the rotary slide valve in the different positions of the adjusting levers, the connection of the rotary slide valves with each other and with a vacuum tank or reservoir 41 and with a working element 2 will now be described by reference to the schematic views shown in FIGS. 4 to 7.

The center bores 34 and 35 which have their orifices 38 and 39 in the apertured plate 13 extend in the short pipe connections 19 and 21; the orifices 38 and 39 are arranged in the center between the outer bores 33 and 36 with their orifices 37 and 40. The bores 33 and 36 lead into the atmosphere, i.e., connect their orifices 37 and 40 directly with the atmosphere.

The vacuum tank 41 is connected in a conventional manner (not shown) with the suction line of the engine or with a separate vacuum pump. The working element 2 is connected by way of the linkage 42 with a conventional water cock 2a in FIG. 13, for example. This water cock 2a which is arranged in a connecting line 64 disposed between the cooling water circulation and a heater body 63 in FIG. 13 interrupts or opens the cooling water supply to this heater body. If the working element 2 is acted upon with vacuum, then it closes the water cock. If, however, atmospheric pressure exists at the working element 2, then the latter opens the water cock by means of a spring (FIGS. 4–7).

Figure 4:
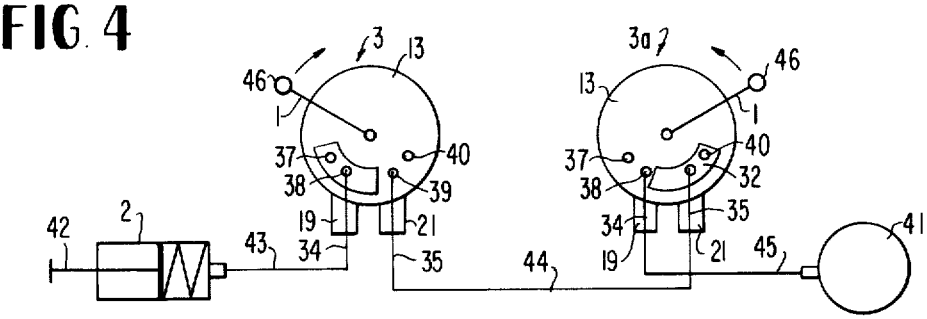
FIGS. 4-7 are schematic views illustrating the operation of two rotary slide valves according to this invention with four apertures and with the pipelines connecting the same with each other as well as with a vacuum tank and a working element in different positions of the adjusting lever handle.
Figure 5:
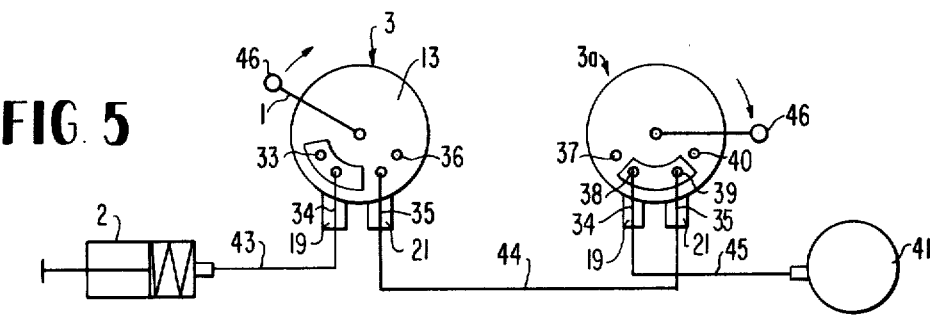

As illustrated in FIGS. 4–7, the short pipe connection 19 and therewith the bore 34 with its orifice 38 of the rotary slide valve 3 is connected by way of a connecting line 43 with the working element 2. The short pipe connection 21 with the bore 35 and its orifice 39 of rotary slide valve 3 is connected by the connecting line 44 with the short pipe connection 21 of the other rotary slide valve 3a. The short pipe connection 19 with the bore 34 and its orifice 38 of the other rotary slide valve 3a, in contradistinction thereto, is connected by the connecting line 45 with the vacuum tank 41. By such a construction and arrangement of the heater actuating installation, the desired conditions for the operation or turning off of the heater will now result in the individual positions of the two adjusting levers 1 arranged in the vehicle. If, as illustrated in FIG. 4, the two adjusting levers 1 are opened, i.e., their adjusting lever handles 46 are displaced upwardly, then vacuum reaches by way of the connecting line 45 and the bore 34 only up to the orifice 38 of the right rotary slide valve 3a since the sealing surface 56 (FIG. 12) provided at program-disk 6 seals off the orifice 38 of the bore 34 of rotary slide valve 3a in FIG. 4. The connecting line 44 with its associated bores and orifices is under atmospheric pressure. Additionally, the connecting line 43 is under atmospheric pressure by way of the bores 33 and 34 with their orifices 37 and 38 and a control channel 32 which atmospheric pressure acts on the working element 2 which as a result thereof opens the water cock (not shown).

If only the left adjusting lever handle 46 of the rotary slide valve 3 is displaced upwardly, whereas the right adjusting lever handle 46 of the rotary slide valve 3a is in its lower position (FIG. 5), i.e., the associated adjusting lever 1 is closed, then vacuum reaches by way of the connecting line 45, the bores 34 and 35 with their orifices 38 and 39 and the control channel 32 of the right rotary slide valve 3a and the connecting line 44 only up to the bore 35 with its orifice 39 of the left rotary slide valve 3 since the sealing surface 57 (FIG. 12) provided in the program-disk 6 seals off the orifice 39 of the bore 35. In the same position of the left rotary slide valve 3 and of the associated adjusting lever 1 as in FIG. 4, the working element 2 therefor receives in the same manner atmospheric pressure and the water cock to the heater body is opened.

Figure 6:
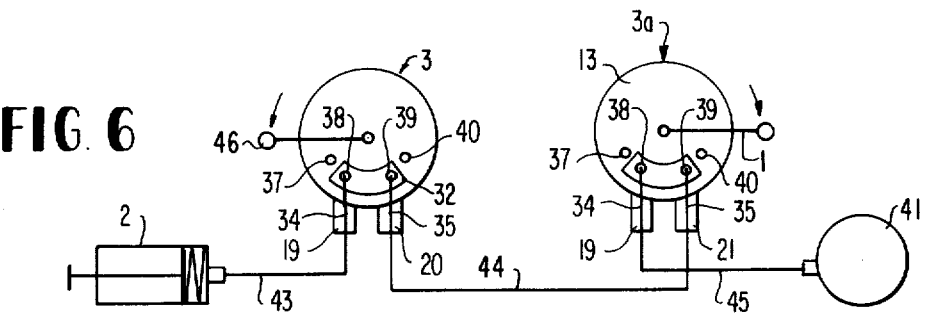

FIG. 6 illustrates that both adjusting levers 1 are closed and thus their adjusting lever handles 46 are deflected downwardly. In this position of the rotary slide valves 3 and 3a and of the control channel 32, vacuum can now reach the working element 2 by way of the center bores and the orifices of the rotary slide valves and the connecting lines 43, 44 and 45 which working element 2, when acted upon with vacuum, then closes the water cock so that the heater body receives no heating medium.

Figure 7:
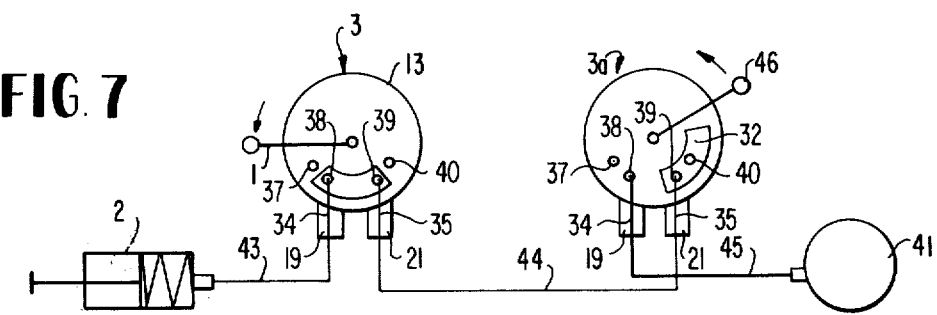

FIG. 7 now additionally illustrates that the adjusting lever 1 of the right rotary slide valve 3a is opened. Vacuum now reaches as in FIG. 1 only up to orifice 38 of the right rotary slide valve 3a. However, the working element 2 now receives atmospheric pressure by way of the right rotary slide valve 3a and the connecting lines 43 and 44 by way of the center bores 34 and 35 of the left rotary slide valve 3 and the right bore of the right rotary slide valve 3a which atmospheric pressure opens the water cock to the heater body.

This demonstrates that exclusively when both adjusting levers 1 are closed, also the water cock will be closed. In every other position of both or of only one of the adjusting levers, the water cock is opened and the heater is therefore heated up by the heating medium.

Figure 8:
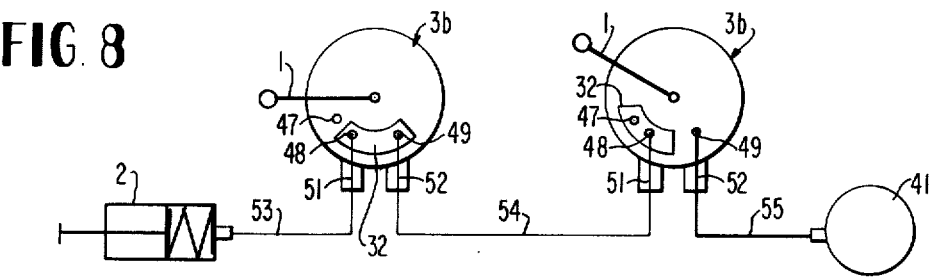
FIGS. 8-11 are schematic views similar to FIGS. 4 to 7 of rotary slide valves in accordance with the present invention which are provided only with three bores.
Figure 9:
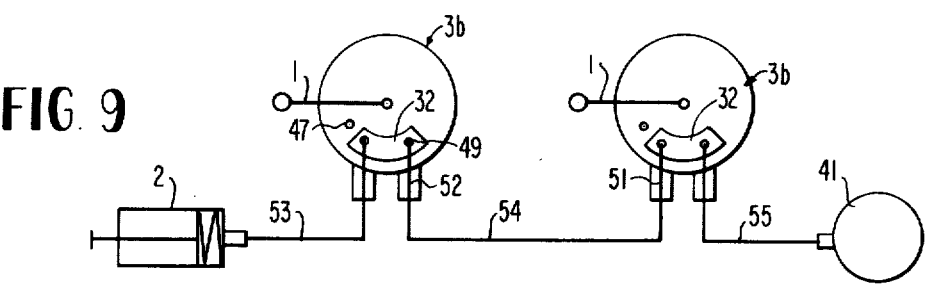
Figure 10:
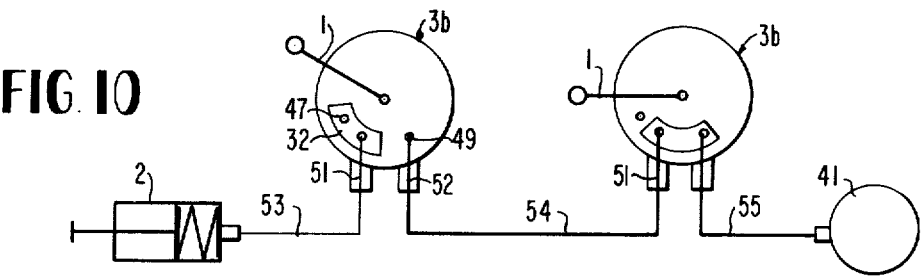
Figure 11:
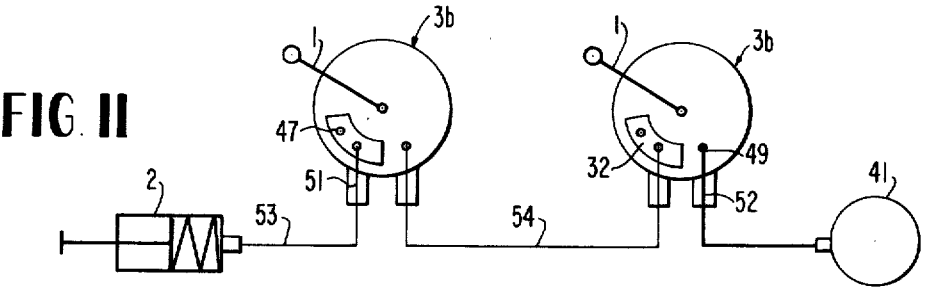

When the possibility exists to arrange the two rotary slide valves in the same position in series one behind the other so that therefore by the actuation of the adjusting levers in one direction also the program-disks 6 are deflected in the same direction with respect to their construction and assembly, one can also utilize in that case two completely identically constructed rotary slide valves which, however, need to be provided only with three bores and associated orifices or ports. FIGS. 8-11 again illustrate in schematic views the different positions of the adjusting levers and their operational consequences. During opening of the right adjusting lever 1 (FIG. 8) vacuum reaches from the vacuum reservoir tank 41 by way of the connecting line 55 and the bore 52 of the right rotary slide valve 3b only up to the orifice 49 of this bore of the right rotary slide valve 3b. Atmospheric pressure can reach by way of the bore 47 of the right rotary slide valve 3b, the control channel 32 thereof, the connecting line 54 and 53, after passing through the bores 51 and 52 of the left rotary slide valve 3 b, to the working element 2 so that the latter opens the water cock (not shown). If both adjusting levers 1 are closed (FIG. 9), then vacuum reaches the working element 2 by way of the connecting lines 53-55 and the bores 51 and 52 as well as the control channels 32 of both rotary slide valves 3b, which as a result thereof closes the water cock. If now only the left adjusting lever 1 is opened, as is illustrated in FIG. 10, then vacuum can penetrate up to the orifice 49 of the bore 52 of the left rotary slide valve 3b by way of the lines 54 and 55 and the bore 52 of the left rotary slide valve 3b. Atmospheric pressure reaches the working element by way of the bores 47 and 51 of the left rotary slide valve 3b and the connecting line 53 so that the working element 52 also in this case opens the water cock. If, as is illustrated in FIG. 11, both adjusting levers 1 are opened, then vacuum reaches by way of the connecting line 55 only up to the orifice 49 of the bore 52 of the right rotary slide valve 3b. The center line 54 is under atmospheric pressure in this case whereas the working element 2 receives atmospheric pressure in the same manner as in FIG. 10 and thereby opens the water cock to the heater body. Consequently also in this embodiment the water cock is closed only when both adjusting levers 1 are closed as shown in FIG. 9. In every other position of one or both adjusting levers 1, the water cock is opened during the beginning of the movement of the adjusting lever and therewith the heater body is heated irrespective in which area are disposed the adjusting levers or one of the adjusting levers with the exception of their closing position.

While we have shown and described two embodiments in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What I claim is:

1. In a heater actuating installation for controlling an air-side heating system for different portions of a motor vehicle passenger compartment, said heating system being of the type having a feed line for circulating heating medium to a heater body means and heating duct means including duct valve means for circulating heated air to the passenger compartment, and said heater actuating installation comprising at least one adjusting lever means for controlling the supply of heat to the motor vehicle passenger compartment, said adjusting lever means operatively connected to said duct valve means for controlling the flow of circulated heated air to the passenger compartment, at least one rotary slide valve means for controlling the supply of the heating medium to the heater body means, said rotary slide valve means being connected with respect to said adjusting lever means to be actuated by said adjusting lever means, thereby enabling circulation of the heating medium to the heater body, and pneumatic means for selectively supplying the heating medium to said heater body means, said pneumatic means being connected to said rotary slide valve means to be responsive to variable pressure levels provided by a source of variable pressure as a function of the actuation of said rotary slide valve means by said adjusting lever means, the improvement comprising at least two of said adjusting lever means and rotary slide value means operatively connected in said motor vehicle compartment for supplying heat to separate portions of the motor vehicle passenger compartment by independent and concurrent actuation of said heating system.

2. A heater actuating installation according to claim 1, wherein said pneumatic means includes a valve in said feed line, said valve being actuated by said variable pressure levels to be open initially adjusting at least one of said individual actuating lever means and rotary slide valve means.

3. A heater actuating mechanism according to claim 1, characterized in that the adjusting lever means are manually actuatable adjusting levers.

4. A heater actuating installation according to claim 1, wherein said two rotary slide valve means are mutually axially symmetrically arranged, and each of said two similar rotary slide valve means which can be deflected out of a center position toward both sides include one apertured plate means provided with four bores of which two central bores are connected with a feed and a discharge line means to and from the rotary slide valve means and the outer bores are connected with the atmosphere, said apertured plate means being covered off by a program-disk means having a control channel means surrounded by a sealing lip, said control channel means being operable in the center position of the rotary slide valve means to connect with each other the orifices of the two center bores and in the two outer positions respectively an outer orifice with the adjacent center orifice of the associated center bore.

5. A heater actuating installation according to claim 4, characterized in that sealing surface means arranged on both sides of the control channel means seal off in the center position of the rotary slide valve means the orifices of the outer bores and in the two other positions of the rotary slide valve means, seal off the orifices of the bores acted upon with said variable pressure level.

6. A heater actuating installation according to claim 5, characterized in that the center bore with the orifice opposite the associated adjusting lever handle of the apertured plate means of one rotary slide valve means and the center bore of the orifice adjacent the associated adjusting lever handle of the apertured plate means of the other rotary slide valve means are connected with each other by a connecting line whereas the other center bores of the two rotary slide valve means are connected, on the one hand, with a working element of said pneumatic means as well as, on the other, with said source of variable pressure levels being a vacuum tank by connecting lines while the outer bores lead into the atmosphere.

7. A heater actuating installation according to claim 4, characterized in that the center bore with the orifice opposite the associated adjusting lever handle of the apertured plate means of one rotary slide valve means and the center bore of the orifice adjacent the associated adjusting lever handle of the apertured plate means of the other rotary slide valve means are connected with each other by a connecting line whereas the other center bores of the two rotary slide valve means are connected, on the one hand, with a working element of said pneumatic means as well as, on the other, with said source of variable pressure levels being a vacuum tank by connecting lines while the outer bores lead into the atmosphere.

8. A heater actuating installation according to claim 1, wherein said two rotary slide valve means are arranged one behind the other in the same position, each of said similar rotary slide valve means which can be deflected out of one position into a further position including an apertured plate means with three bores, of which a center and an outer bore are connected with a feed and a discharge line to and from the rotary slide valve means and the third bore, whose orifice is adjacent the corresponding adjusting lever handle, is connected with the atmosphere, said apertured plate means being covered off by a program-disk means with a control channel means which in one position of a respective rotary slide valve means connects the center bore with the orifice of one outer bore and in the other position connects the orifice of the center bore with the orifice of the other outer bore.

9. A heater actuating installation according to claim 8, characterized in that the bore with the center orifice of the one rotary slide valve means and the bore with the orifice opposite the adjusting lever handle of the other rotary slide valve means are connected with each other by a connecting line whereas the bore provided with the center orifice of the other rotary slide valve means is connected with a working element of said pneumatic means and the orifice of the one rotary slide valve means opposite the adjusting lever handle is connected with a vacuum tank of said variable pressure level source and the bores with the orifices adjacent the adjusting lever handle of the two rotary slide valve means lead each into the atmosphere.

10. A heater actuating installation according to claim 1, characterized in that each rotary slide valve means includes an apertured plate means, and each apertured plate means is covered off by a program disk means, and in that a flat spring element is arranged at the apertured plate means of rotary slide valve means which in one position of the program disk means engages in a notch provided thereat and fixes the program disk means in this preferred position.

11. A heater actuating installation according to claim 10, characterized in that said one position is the center position of the program disk means.

12. A heater actuating installation according to claim 10, characterized in that the portions of the program disk means which are pressed by the flat spring element sealingly against the apertured plate means essentially consist of synthetic resinous materials whereas other portions of the program disk means essentially consist of metal.

13. A heater actuating installation according to claim 12, characterized in that said first mentioned portions are those whose end surfaces abut sealingly at the apertured plate means.

14. A heater actuating installation according to claim 13, characterized in that the other portions are those which form bearing surfaces.

15. A heater actuating installation according to claim 14, characterized in that said metal is a die-cast metal.

16. A heater actuating installation according to claim 1, characterized in that each rotary slide valve means includes an apertured plate means and a program disk means sealingly abutting said respective apertured plate means, and in that the program disk means carries a pin which in the closing position of the adjusting lever means engages in a radial slot of the adjusting lever means fitting the diameter of the pin and in each opening position of the adjusting lever means engages in another slot also fitting the diameter of the pin, said another slot adjoining the end of the radial slot opposite the pivot point of the adjusting lever means, and said another slot having a circular shape with the center point of the circle thereof coinciding with the pivot point of the adjusting lever means.

* * * * *